US005768058A

United States Patent [19]
Hofland

[11] Patent Number: 5,768,058
[45] Date of Patent: Jun. 16, 1998

[54] CRASH STOP AIRLOCK MECHANISM

[75] Inventor: Jonathan C. Hofland, San Jose, Calif.

[73] Assignee: Quantum Corporation, Milpitas, Calif.

[21] Appl. No.: 670,968

[22] Filed: Jun. 26, 1996

[51] Int. Cl.⁶ ............................... G11B 5/54; G11B 21/22
[52] U.S. Cl. ........................................ 360/105; 360/97.02
[58] Field of Search ................................. 360/105, 106, 360/97.02, 97.03, 97.01

[56] References Cited

U.S. PATENT DOCUMENTS

| 5,124,867 | 6/1992 | Kitahori et al. | 360/105 |
| 5,313,354 | 5/1994 | Sampietro et al. | 360/105 |
| 5,319,511 | 6/1994 | Lin | 360/105 |
| 5,477,403 | 12/1995 | Strickler | 360/105 |
| 5,602,700 | 2/1997 | Viskochil et al. | 360/105 |

*Primary Examiner*—Stuart S. Levy
*Assistant Examiner*—William J. Klimowicz

*Attorney, Agent, or Firm*—Debra A. Chun; Nydegger & Associates

[57] ABSTRACT

A combinational actuator latch and crash stop apparatus and method are provided. In one embodiment, an air lock apparatus includes a wind vane portion adapted to have a wind force exerted thereon. The wind force is generated by a rotating disk. The combinational air lock and crash stop apparatus also includes an airlock latch portion coupled to the wind vane portion. The airlock latch portion is adapted to lock the actuator arm into a selected position. Specifically, the airlock latch portion is adapted to lock an actuator arm into a position such that the distal end of the actuator arm and a head attached to the distal end of the actuator arm will be locked at or near the inner diameter of the disk. The present combinational air lock and crash stop apparatus further includes a crash stop coupled to the airlock latch portion. The crash stop is adapted to restrict the rotation of the actuator arm such that the distal end of the actuator arm and the head are prevented from being moved outwardly beyond the outer diameter of the disk.

18 Claims, 7 Drawing Sheets

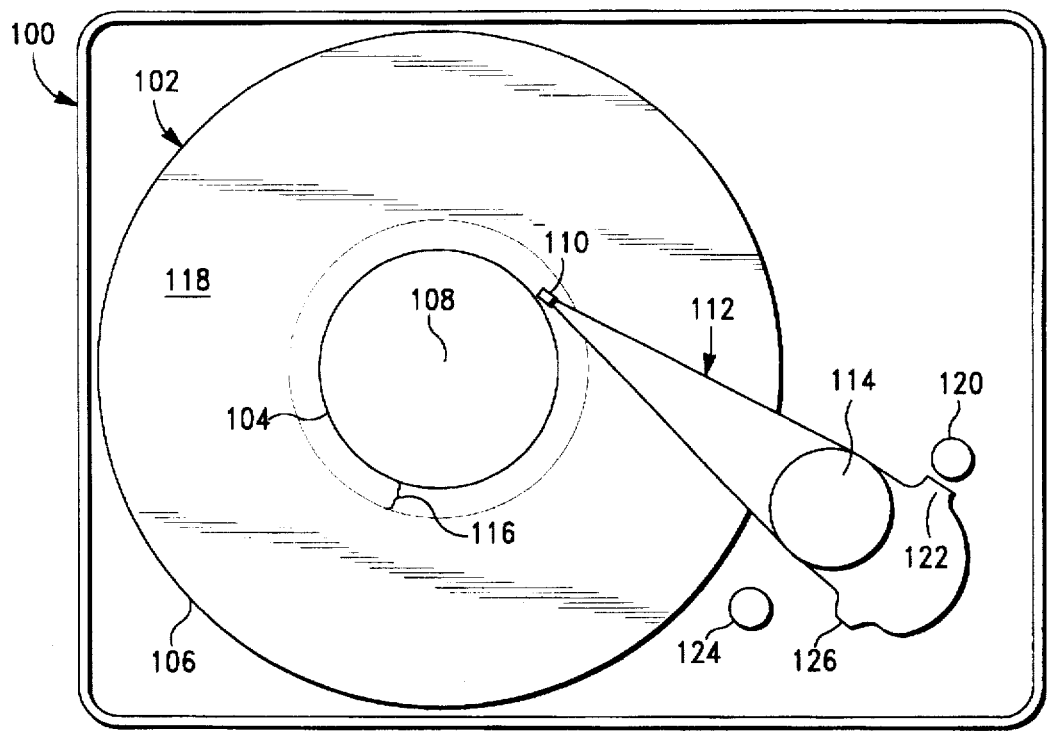
FIG.—1C
(PRIOR ART)
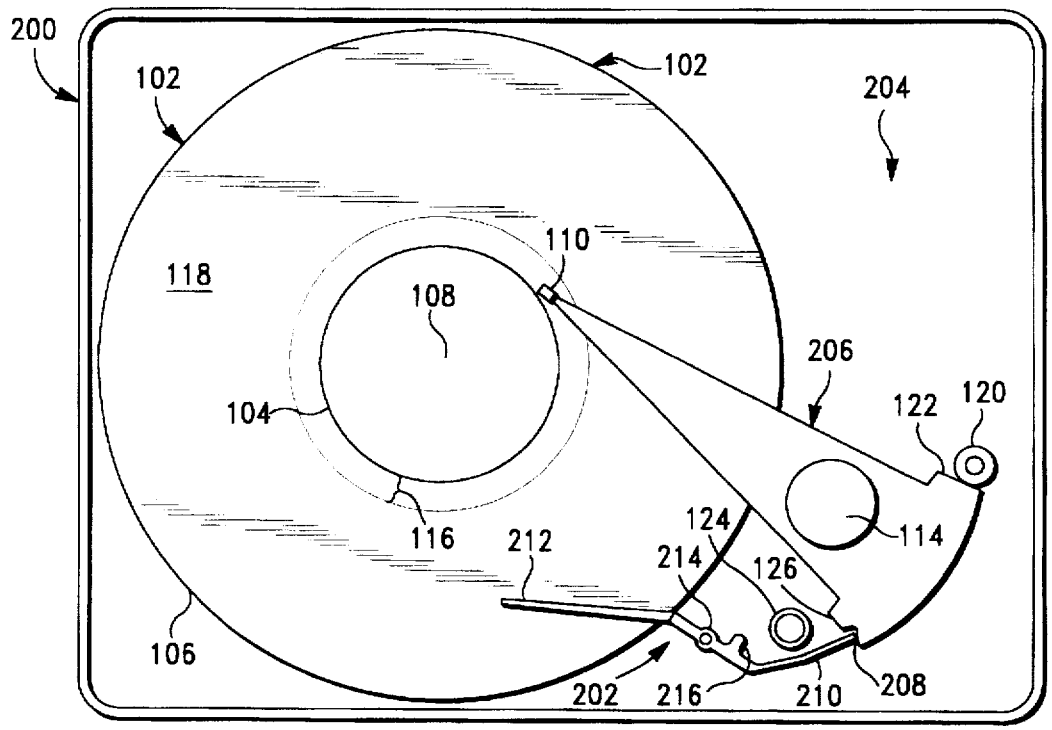
FIG.—2
(PRIOR ART)

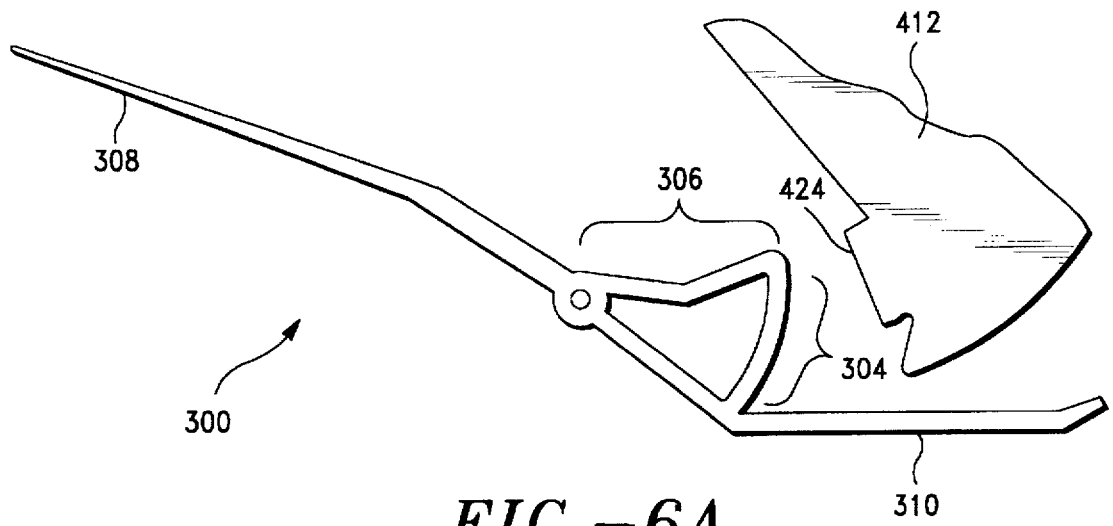
*FIG.—6A*
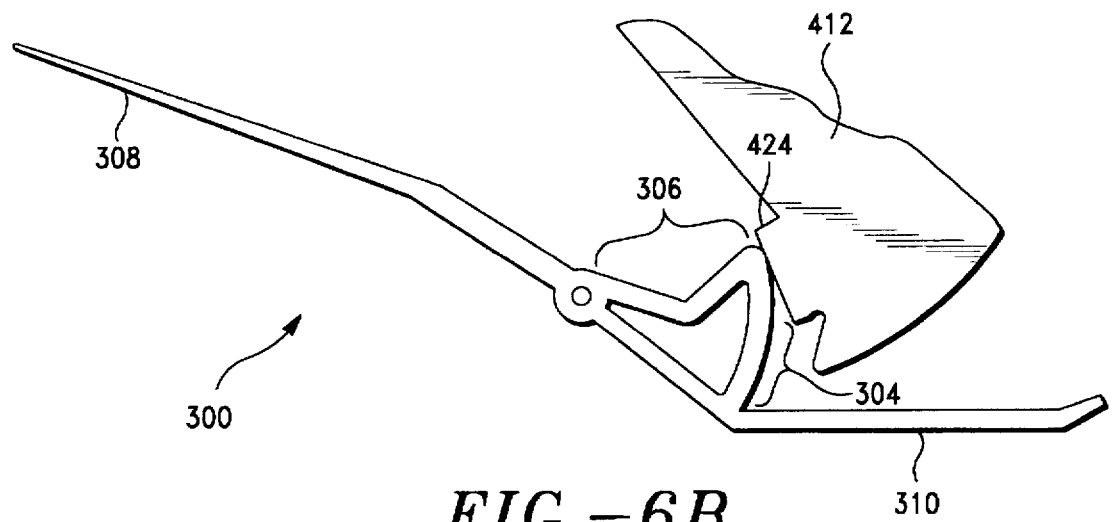
*FIG.—6B*
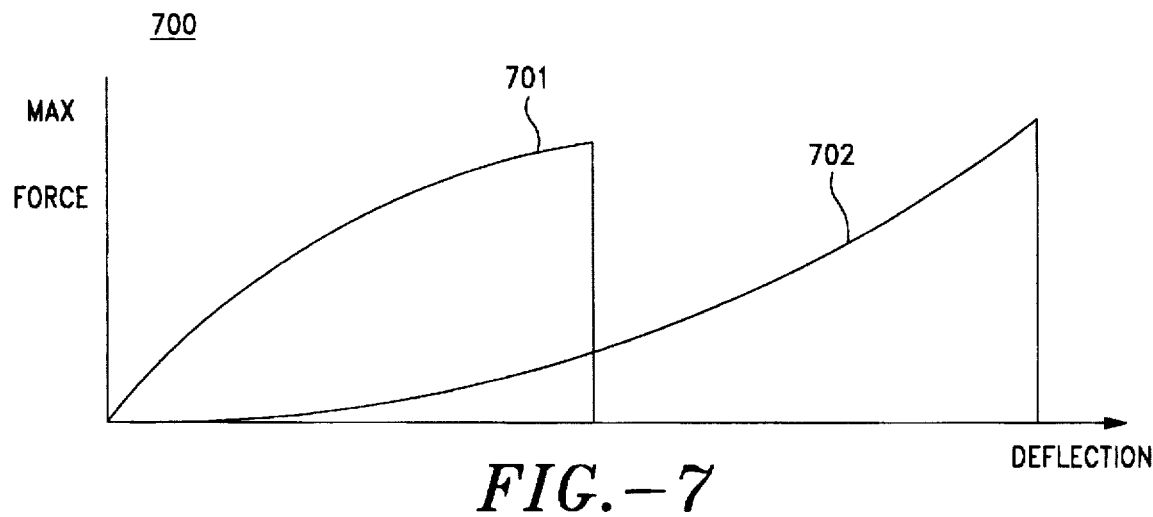
*FIG.—7*

CRASH STOP AIRLOCK MECHANISM

BACKGROUND OF THE INVENTION

1. Field of the Invention

The present invention pertains to a head/disk assembly (HDA). In particular, the present invention is related to a combined crash stop actuator latch mechanism for an HDA. More specifically, the present invention pertains to a crash stop airlock mechanism for use in an HDA.

2. Background Technology

Magnetic disk storage refers to storing data by magnetic recording on the flat surfaces of one or more disks which in use rotate around a common spindle. A HDA typically includes a magnetic disk, a magnetic head, and an access mechanism, such as an actuator arm, for moving the head across the disk. HDAs are commonly used in computers for storing data.

As shown in Prior Art FIG. 1A, an exemplary prior art HDA 100 includes a disk 102 having an inner diameter (ID) 104 and an outer diameter (OD) 106. The disk 102 is supported by a spindle 108 for rotating the disk 102. A wind force is generated by the disk 102 as the disk 102 rotates counterclockwise on the spindle 108 during an operating mode of the HDA 100. A head 110 for reading data from the disk 102 is attached to a distal end of an actuator arm 112 which pivots about an actuator shaft 114 in a plane parallel to the surface of the disk 102. The head 110 is designed so that, during the operation mode, the wind force generated by the rotating disk 102 moves the head 110 to a flying height of a few microns above the surface of the disk 102. A flying height speed of rotation is required to generate a sufficient aerodynamic force to raise the head 110 to a flying height over the disk 102. The actuator arm 112 is controlled by a voice coil motor (VCM) to pivot about the actuator shaft 114. As the actuator arm 112 pivots, the head 110 travels radially across the disk 102.

With reference still to Prior Art FIG. 1A, the disk 102 has a landing zone 116 and a data zone 118. The data zone 118 is the area of the disk which can be allocated to data. In most HDAs, in order to protect storage media in the data zone 118 of the disk 102, the head 110 must be prevented from contacting the surface of the data zone 118 of the disk 102. Contact between the head 110 and the surface of the data zone 118 can cause damage to storage media in the data zone 118. The landing zone 116 is not used for storing data and is therefore not susceptible to data loss damage caused by contact with the head 110. During a shut down sequence, wherein the HDA 100 switches from the operating mode to an OFF mode, it is necessary to place the head 110 in the landing zone 116. The head 110 is moved to the landing zone 116 by the rotating actuator arm 112 such that the head 110 is disposed over the landing zone 116. It is also necessary, in the prior art HDA 100, to prevent the head 110 from contacting the spindle 108 at the ID 104 or from traveling off of the disk 102 at the OD 106. In order to prevent the head 110 from contacting the spindle 108, counter-clockwise rotation of the actuator arm 112 is limited by an ID crash stop 120 which contacts an ID stop tab 122 disposed on the back end of the actuator arm 112. In order to prevent the head 110 from traveling off of the disk 102 at the OD 106, clockwise rotation of the actuator arm 112 is limited by an OD crash stop 124 which contacts an OD stop tab 126 disposed on the back end of the actuator arm 112.

With reference now to Prior Art FIG. 1B, a diagram is shown of a prior art HDA 100 in an operating mode with the OD stop tab 126 abutting the OD crash stop 124. As shown in Prior Art FIG. 1B, the OD crash stop 124 prevents the head 110 from traveling off of the disk 102 at the OD 106.

With reference to Prior Art FIG. 1C, a diagram is shown of a prior art HDA 100 in an operating mode with the ID stop tab 122 abutting the ID crash stop 120. As shown in Prior Art FIG. 1C, the ID crash stop 120 prevents the head 110 from contacting the spindle 108.

With reference still to FIG. 1C, another problem associated with the exemplary prior art HDA 100 is that during the OFF mode where the disk is not spinning or up to speed, the actuator arm 112 and head 110 must be secured in the landing zone 116 so that the head 110 does not travel into the data zone 118. External shocks applied to the HDA 100 during the OFF mode (e.g. a transient surge applied to the VCM or a shock force applied to the HDA 100 during shipping and handling) can move the head 110 into the data zone 118 if the head 110 is not well secured in the landing zone 116. One prior art method for securing a head in a data zone of a disk is to use a prior art airlock to lock the actuator arm of the HDA in the landing zone while the HDA is in an OFF mode.

With reference now to Prior Art FIG. 2, a diagram is shown of a prior art HDA 200 having a prior art airlock 202. The prior art HDA 200 includes all of the elements of Prior Art FIG. 1C in addition to an airlock 202 and an airlock adapted actuator assembly (AAAA) 206. The AAAA 206 has a notch 208 formed in the back end thereof for receiving an airlock latch 210 of the airlock 202. That is, the airlock latch 210 locks the AAAA 206 in a position such that the head 110 is located in the landing zone 116 while the HDA 200 is in the OFF mode. The airlock latch portion 210 locks the AAAA 206 in the landing zone 116 while the HDA 200 is in the OFF mode. Therefore, the head 110 is prevented from moving into the data zone 118 thereby preventing damage to the storage media in the data zone 118.

With reference still to Prior Art FIG. 2, the prior art airlock 202 includes an airlock vane 212 which is acted upon by the wind force generated by the rotating disk 102 while the HDA 200 is in the operating mode. The airlock latch portion 210 and the airlock vane 212 both rotate about an airlock shaft 214 in a plane parallel to the surface of the disk 102. The airlock shaft 214 rises up perpendicularly from a bottom support plate 204 of the HDA 200. As the disk 102 rotates counterclockwise, the airlock vane 212 is torqued in a clockwise direction about the airlock shaft 214 by the wind force generated by the rotating disk 102. The airlock latch portion 210 includes a magnetic element 216 which, in co-operation with a magnet, not shown, of the VCM, provides a counterclockwise torque to the airlock latch portion 210. The clockwise torque applied by the wind force generated by the disk 102 and counterclockwise torque provided by the magnetic element 216 oppose each other. While the HDA 200 is in the OFF mode, the disk 102 is at rest and no wind force is generated. Without a clockwise wind torque, the counterclockwise torque generated by the magnetic element 216 rotates the airlock latch portion 210 clockwise to a locked position. During a start up sequence, the HDA 100 switches from the OFF mode to the operating mode. As a result, the disk 102 begins rotating and consequently the clockwise torque generated by the wind force overcomes the counterclockwise torque generated by the magnetic element 216 so that the sum of torques provided to the airlock latch portion 210 is a clockwise torque. Also during the start up sequence, the AAAA 206 is moved slightly by the VCM so that the airlock latch portion 210 is disengaged from the notch 208. Once disengaged from the notch 208, the airlock latch portion 210 is pivoted clockwise about the airlock shaft 234 by clockwise wind force applied to the airlock vane 212. While the HDA 200 is in the operating mode, the airlock latch portion 210 is pivoted clockwise out of the way of the rotational travel of the back end of the AAAA 206.

With reference still to Prior Art FIG. 2, the OD stop tab 126 and the OD crash stop 124 serve to limit the clockwise travel of the AAAA 206. With the OD stop tab 126 abutting the OD crash stop 124, the head 110 is positioned at an OD crash stop head position near the OD 106 of the disk 102. The OD crash stop head position is the outer diameter limit of the data zone 118. The available disk real estate that can be allocated to data in the prior art HDA 200 is bounded by the outer crash stop head position and the landing zone 116. The maximum amount of data stroke that can be utilized in the prior art HDA 200 is, therefore, limited by the nominal locations and tolerance distributions of the outer crash stop 124 and of the landing zone 116. Less disk real estate is lost to tolerances if the location of the outer crash stop 124 can be held accurately relative to the location of the landing zone 116.

In conventional HDAs, the prior art OD crash stop 124 is comprised of a rubber donut placed around an OD crash stop post. Manufacturing of the prior art HDA 200 requires very tight positioning tolerances for the position of the OD crash stop 124. Such tight positioning tolerances are difficult to achieve and can reduce the yield of acceptable parts while increasing the time and cost required for manufacturing.

With reference still to Prior Art FIG. 2, the crash stops 120 and 124 in the prior art HDA 200, must be able to decelerate the moving AAAA 206 in a controlled manner so that neither the head 110 nor the storage media are damaged. However, the OD crash stop 124 must not provide excessive deflection of the AAAA 206 because excessive deflection of the AAAA 206 from the OD crash stop 124 can cause a reduction in the area of the disk 102 which can be allocated to data. The rubber donut type OD crash stop 124 can cause excessive deflection of the AAAA 206 from the OD crash stop 124 which results in a reduction in the area of the disk 102 which can be allocated to data.

With reference still to Prior Art FIG. 2, there are also problems associated with reworking the prior art HDA 200. Reworking the prior art HDA 200 includes repairing and replacing parts. During rework of the prior art HDA 200, it can be necessary to remove disk the 102 from the spindle 108 which requires unloading the head 110 off of the disk 102. In the prior art HDA 200, the OD crash stop 124 must be removed in order to pivot the AAAA 206 clockwise past the position of the OD crash stop 124. The necessity of removing the OD crash stop 124 in order to rework the HDA 200 is very time consuming.

Thus, a need exists for an OD crash stop mechanism which provides increased ease of manufacturing including less stringent tolerancing requirements. A further need exists for an OD crash stop mechanism which need not be removed during rework. Yet another need exists for an OD crash stop mechanism having improved force/deflection characteristics.

SUMMARY OF THE INVENTION

The present invention provides a crash stop actuator latch which includes an outer diameter crash stop mechanism integral with an actuator latch. The present invention provides increased ease of manufacturing including less stringent tolerancing requirements. The present invention further provides an OD crash stop mechanism which need not be removed during rework. Additionally, the present invention provides an OD crash stop mechanism having improved force/deflection characteristics.

Specifically, in one embodiment, an actuator locking apparatus includes an actuator latch portion and crash stop integrally coupled to the latch portion. The actuator latch portion includes a latching arm adapted to lock an actuator arm of an actuator assembly into a selected position. Specifically, the latching arm is adapted to lock the actuator arm into a position such that the distal end of the actuator arm and a head attached to the distal end of the actuator arm will be locked at or near an inner diameter of the disk. The crash stop is integral with the latch portion and is adapted to restrict rotation of the actuator assembly such that the head is prevented from moving outwardly beyond an outer diameter of the disk.

In another embodiment, a combinational air lock and crash stop apparatus includes a wind vane portion adapted to have a wind force exerted thereon. The wind force is generated by a rotating disk. The combinational air lock and crash stop apparatus also includes an airlock latch portion coupled to the wind vane portion. The airlock latch portion is adapted to lock an actuator arm so that the head is locked at or near the inner diameter of the disk. The present combinational air lock and crash stop apparatus further includes a crash stop coupled to the airlock latch portion. The crash stop is adapted to restrict the rotation of the actuator assembly such that the distal end of the actuator arm and the head are prevented from being moved outwardly beyond the outer diameter of the disk. The crash stop includes a buckling and a bending portion which resiliently restricts the rotational motion of the actuator assembly.

In another embodiment, the combinational air lock and crash stop apparatus includes a magnetic portion for providing a magnetic force to the crash stop airlock wherein the magnetic force opposes the wind force. In yet another embodiment, a filter is integral with the combinational airlock and crash stop apparatus. A method is also provided for restricting the rotation of the actuator arm in accordance with the present invention.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The present invention is illustrated by way of example, and not by way of limitation, in the figures of the accompanying drawings and in which like reference numerals refer to similar elements and in which:

Prior Art

Prior Art

Prior Art FIG. 1C is a diagram of the prior art HDA 100 in an operating mode with the actuator arm abutting the outer diameter crash stop.

Prior Art FIG. 2 is a diagram of a prior art HDA having two crash stops and an airlock.

FIG. 6A is a diagram of CSAL 300 of FIG. 3 with a stop tab of an actuator arm in close proximity.

FIG. 6B is a is a diagram of CSAL 300 of FIG. 3 abutting a stop tab of an actuator arm.

FIG. 7 is a graph of force/deflection characteristics of a prior art rubber donut OD crash stop and for a buckling and bending airlock crash stop according to the present invention.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

Reference will now be made in detail to the preferred embodiments of the invention, examples of which are illustrated in FIGS. 3A–8 of the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1A:
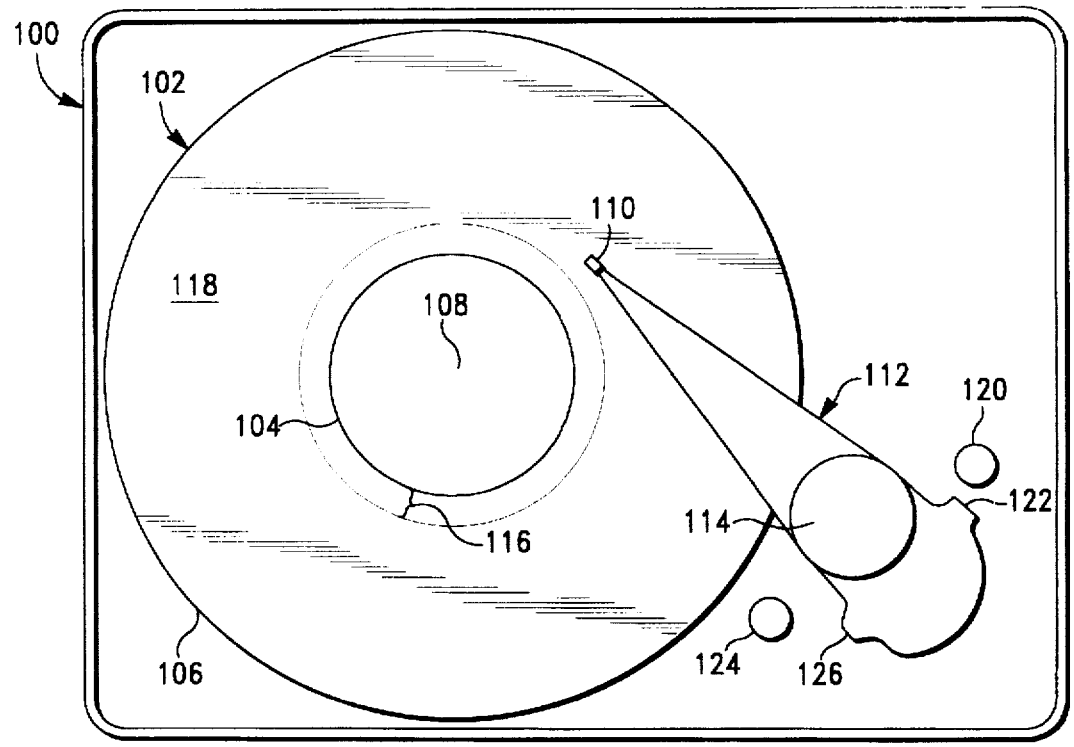
FIG. 1A is a diagram of a prior art HDA 100 having two crash stops with an actuator arm positioned in an operating position.
Figure 1B:
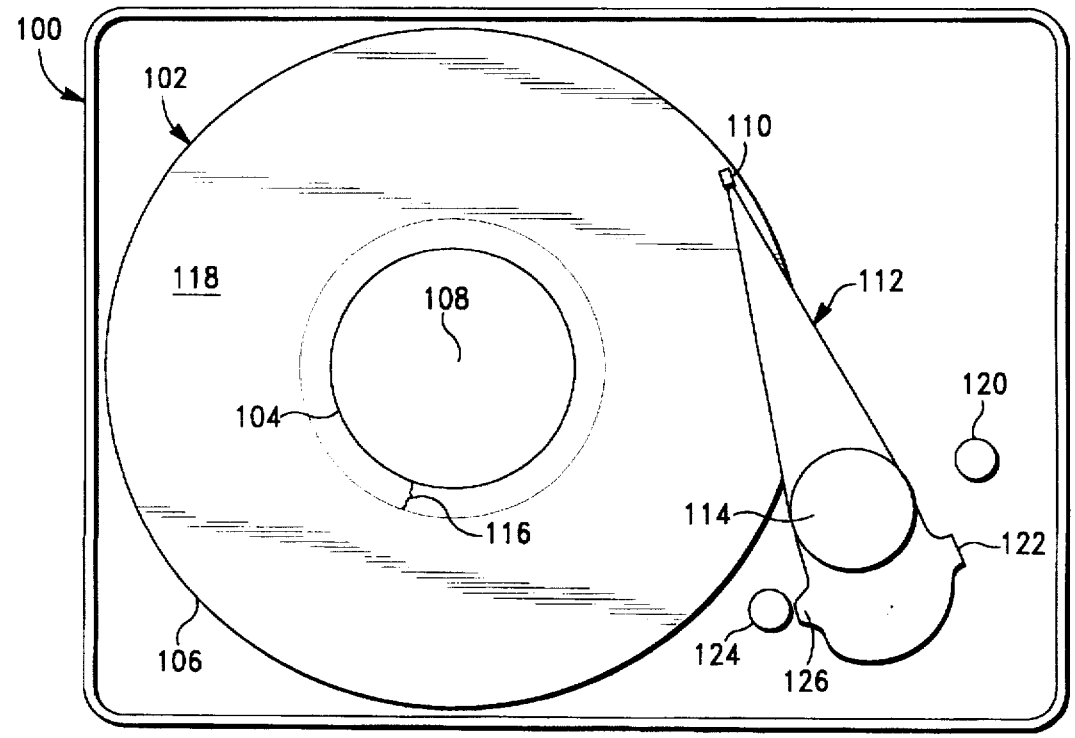
FIG. 1B is a diagram of the prior art HDA 100 in an operating mode with the actuator arm abutting the inner diameter crash stop.
Figure 3A:
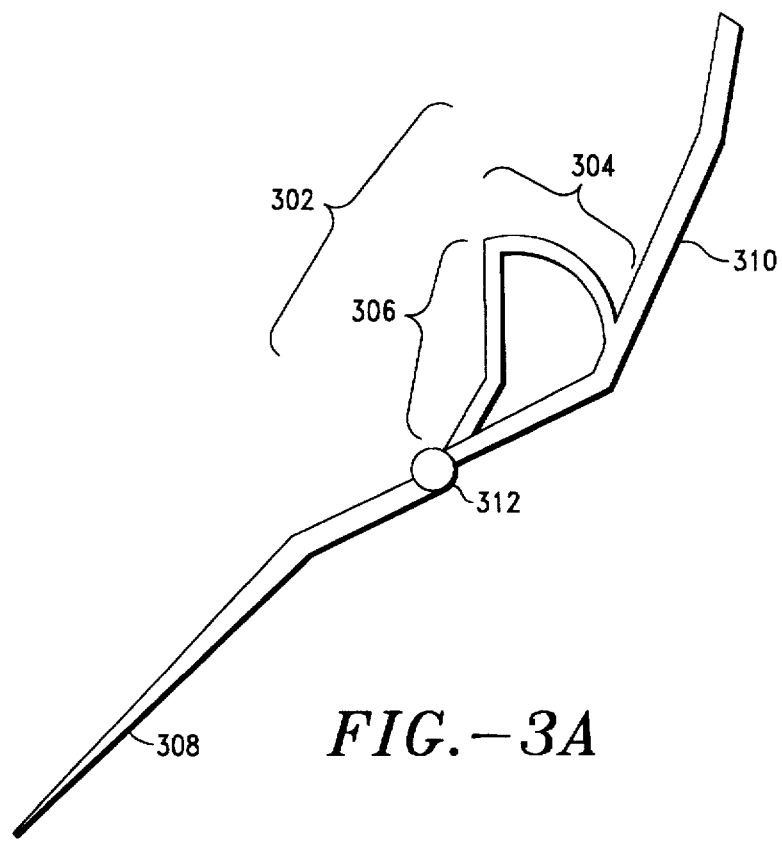
FIG. 3A is a top view of a crash stop airlock (CSAL) according to the present invention.

With reference now to FIG. 3A, a diagram of a crash stop airlock (CSAL) 300 according to the present invention is shown. The CSAL 300 includes an airlock crash stop section (ACSS) 302 according to the present invention. The ACSS 302, which is integral with the CSAL 300, provides an outer diameter crash stop for an actuator arm in an HDA. The ACSS 302 includes a bending section 304 and a buckling section 306. The CSAL 300 also includes an airlock vane portion 308 and an airlock latch portion or arm 310 coupled by an airlock bore 312 which is mounted on an airlock shaft to provide rotation of the CSAL 300. A resilient mechanism 314 (shown in FIG. 3B) provides, in concert with an external means, a resilient force to counter a wind force delivered to the airlock vane portion 308 by a rotating disk. In the present embodiment, the resilient mechanism 314 is a magnetic element such as a magnetic ball. The magnetic element is acted upon by an external magnet, not shown, to create a resilient force. Although a magnetic element is used in the present embodiment, the present invention is also well suited for the use of other resilient mechanisms such as, for example, a spring attached between the CSAL 300 and a fixed point in an HDA.

Figure 3B:
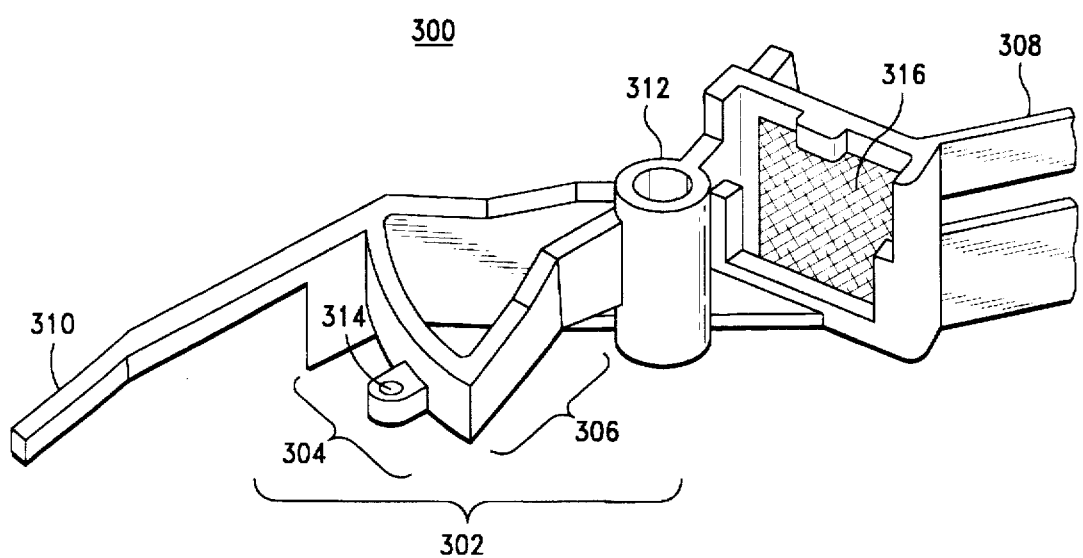
FIG. 3B is a perspective view of a crash stop airlock (CSAL) according to the present invention with an air filter integral therewith.

With reference now to FIG. 3B, a diagram is shown of an exemplary crash stop airlock (CSAL) 300 according to the present invention with an air filter 316 attached thereto. The air filter 316 filters air inside of an HDA so that performance of the HDA is not degraded by contaminate particles.

Figure 4:
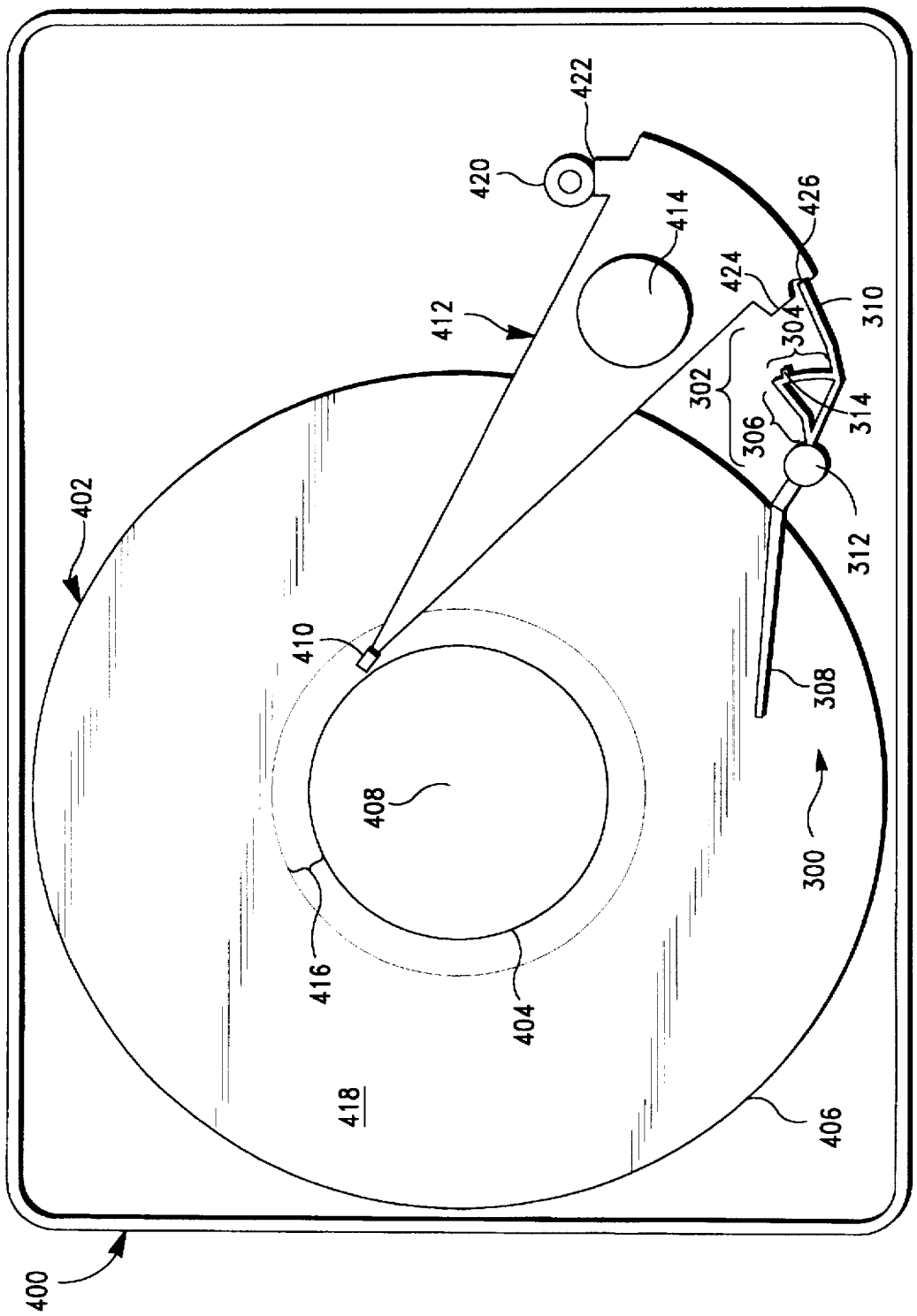
FIG. 4 is a top view of CSAL 300 of FIG. 3 deployed in a latched position in accordance with the present invention.

With reference now to FIG. 4, the CSAL 300 is shown deployed in a latched position in a HDA 400. The HDA 400 includes a disk 402 having an inner diameter (ID) 404 and an outer diameter (OD) 406. The disk 402 is supported by a spindle 408 for rotating the disk 402. A wind force is generated by the disk 402 as the disk 402 rotates counterclockwise on the spindle 408. A head 410 for reading data from the disk 402 is attached to a distal end of an actuator arm 412 which pivots about an actuator shaft 414 in a plane parallel to the surface of the disk 402.

With reference still to FIG. 4, the disk 402 has a landing zone 416 and a data zone 418. During a shut down sequence, wherein the HDA 400 switches from the operating mode to an OFF mode, the head 410 is moved from the data zone 418 to the landing zone 416. The head 410 is moved to the landing zone 416 by rotating the actuator arm 412 such that the head 410 is disposed over the landing zone 416. However, the head 410 must not contact the spindle 408 near the ID 404 of the disk 402. Similarly, the head 410 must not travel off of the disk 402 at the OD 406. In order to prevent the head 410 from contacting the spindle 408, counterclockwise rotation of the actuator arm 412 is limited by an ID crash stop 420 which contacts an ID stop tab 422 at the back end of actuator arm 412. In order to prevent the head 410 from traveling off of the disk 402 at the OD 406, clockwise rotation of the actuator arm 412 is limited by the CSAL 300 of the present invention.

With reference still to FIG. 4, during operation mode, the disk 402 rotates counterclockwise and generates a wind force. While the disk 402 rotates counterclockwise, the CSAL 300 is torqued in a clockwise direction about airlock bore 312 by the wind force applied to the airlock vane portion 308. Alternatively, the disk 402 can be rotated in a clockwise direction whereby the CSAL 300 is torqued in a counterclockwise direction. As mentioned above in the present embodiment, the airlock latch portion 310 includes a magnetic element 314. The magnetic element 314, in co-operation with a magnet, not shown, of the VCM, provides a counterclockwise torque to the CSAL 300. The clockwise torque applied by the wind force generated by the disk 402 and counterclockwise torque provided by the magnetic element 314 oppose each other. While the HDA 400 is in the OFF mode, the disk 402 is at rest and no wind force is generated. Without a clockwise wind torque, the counterclockwise torque generated by the magnetic element 314 rotates the CSAL 300 counterclockwise to the locked position shown in FIG. 4. The actuator arm 412 has a notch 426, formed in the back end thereof, for receiving the airlock latch portion 310 of the airlock 300. The airlock latch portion 310 engages the notch 426 to lock the actuator arm 412 in a position such that the head 410 is disposed in the landing zone 416 while the HDA 400 is in the OFF mode. While the actuator arm 412 is locked, the head 410 is prevented from moving out of the landing zone 416.

Figure 5:
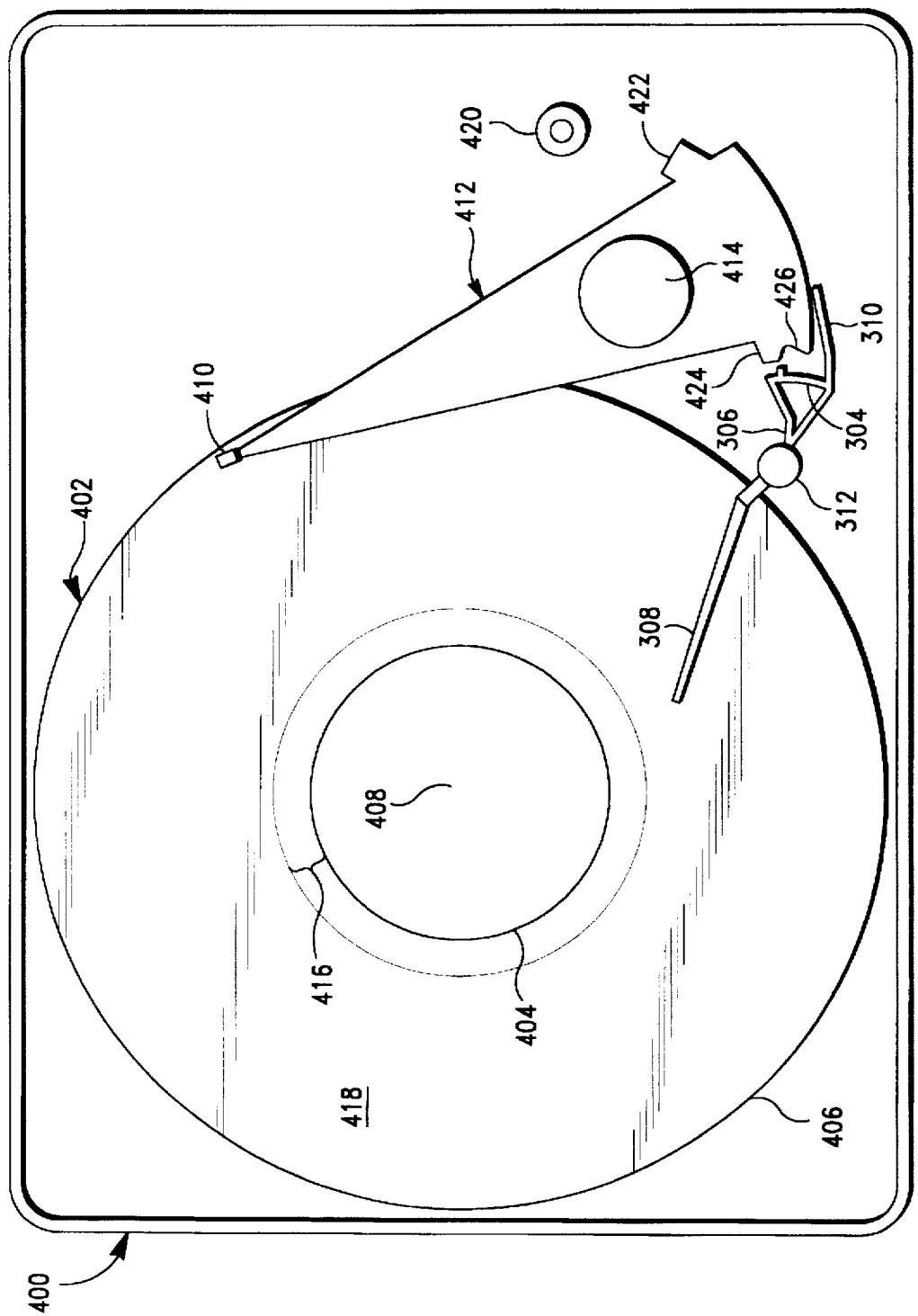
FIG. 5 is a top view of CSAL 300 of FIG. 3 deployed in an operating position in accordance with the present invention.

With reference now to FIG. 5, the CSAL 300 is shown deployed in an operating mode. During a start up sequence, the HDA 400 switches from the OFF mode to the operating mode. As a result, the disk 402 begins rotating and the clockwise torque on the CSAL 300 generated by the wind force applied to the wind vane portion 308 overcomes the counterclockwise torque generated on the CSAL 300 by the magnetic element 314. As a result, the sum of torques provided to the CSAL 300 is a clockwise torque. Also during the start up sequence, the actuator arm 412 is moved slightly by the VCM so that the airlock latch portion 310 can disengage from the notch 426. Once the airlock latch portion 310 is disengaged from the notch 426, the CSAL 300 is rotated clockwise about airlock bore 312 by the wind force applied to the airlock vane portion 308. Moreover, while the HDA 400 is in the operating mode, the CSAL 300 is rotated clockwise such that the airlock latch portion 310 is moved clear of the rotational travel path of the back end of actuator arm 412.

With reference still to FIG. 5, the airlock crash stop section (ACSS) 302 is an outer diameter crash stop for the actuator arm 412. The actuator arm 412 includes an OD stop tab 424 which contacts the bending section 304 of the ACSS 302. When the OD stop tab 424 contacts the bending section 304, the head 410 at the distal end of the actuator arm 412 is prevented from traveling outward beyond the OD 406 of the disk 402. When contacted by the OD stop tab 424, the bending section 304 bends inwardly and the buckling section 306 buckles inwardly to absorb force delivered by the OD stop tab 424 to the ACSS 302.

With reference now to FIG. 6A, a diagram is shown of the CSAL 300 of FIG. 3 with the stop tab 424 of the actuator arm 412 in close proximity thereto. The buckling section 306 and the bending section 304 are shown here in an unstressed state.

With reference next to FIG. 6B, a diagram is shown of the CSAL 300 of FIG. 3 with the stop tab 424 of the actuator arm 412 contacting and compressing the ACSS 302. The bending section 304 is resiliently bent by the force applied by the stop tab 424. The buckling section 306 is resiliently buckled by the force applied by the stop tab 424. The amount of bending and buckling, shown in FIG. 6B, of the bending section 304 and the buckling section 306 is exaggerated for purposes of clarity.

The present invention eliminates the need for a separate OD crash stop to be attached to the base plate of an HDA. As a result, the ACSS 302 of the present invention eliminates the tight OD crash stop placement tolerancing requirements associated with the prior art. That is, in the prior art, an OD crash stop would have to be precisely located in the HDA due to tolerance issues associated with the separate OD crash stop. Such tight tolerancing or locating is expensive and error prone. However, with the present invention, both ends of the data zone, at the ID and OD, are related to a single point, the airlock shaft. Thus, the total number of tolerances encountered is reduced.

In the present invention, the airlock shaft is positioned in the HDA with respect to the actuator arm 412 (See FIG. 5). Adjustments to the position of the ACSS 302 can be accomplished during fabrication of the ACSS 302. Therefore, the present invention allows HDAs to be mass produced with a specific airlock shaft opening formed therein. Placement of the airlock shaft opening on the base plate of the HDA does not require additional tight tolerancing and locating associated with prior art OD crash stops. The shaft can be positioned by a machining process which is very accurate and relatively inexpensive in comparison to assembly locating. Thus, with the present invention, precise positioning of the ACSS 302 is accomplished during fabrication of the CSAL 300 during an easily controllable fabrication step.

With reference now to FIG. 7, a graph 700 shows force/deflection characteristics for a prior art rubber donut OD crash stop and for the buckling and bending ACSS 302. Graph 700 has deflection distance on the horizontal axis and force on the vertical axis. A first trace 701 represents the force/deflection characteristics of the present buckling and bending ACSS 302. A second trace 702 represents the force/deflection characteristics of the prior art rubber donut OD crash stop. The area under the first trace 701 represents the amount of energy absorbed by ACSS 302 when a force, having a maximum value, Fmax, is applied to the ACSS 302. The area under the second trace 702 represents the amount of energy absorbed by the prior art rubber donut OD crash stop when a force, having a maximum value, Fmax, is applied thereto. The area under the first trace 701 is equal to the area under the second trace 702 and each of the areas represents a total energy value, E. Therefore, the energy absorbed by the ACSS 302 is equal to the energy absorbed by the prior art rubber donut OD crash stop when a force, having a maximum value, Fmax, is applied to each. However, the amount of deflection required to absorb E for the prior art rubber donut is greater than the amount of deflection required to absorb E for the ACSS 302 of the present invention. It is desirable to minimize the amount of deflection required by an HDA crash stop to absorb a predetermined amount of energy. However, the deceleration of the actuator arm 412 must be controlled so that no damage results to the head 410 when the actuator arm 412 is stopped. By minimizing deflection while maintaining an acceptable controlled deceleration, the area of the disk which can be allocated to data is maximized. Hence, the present invention provides improved force/deflection characteristics and increases the area of a disk which can be allocated to data.

Figure 8:
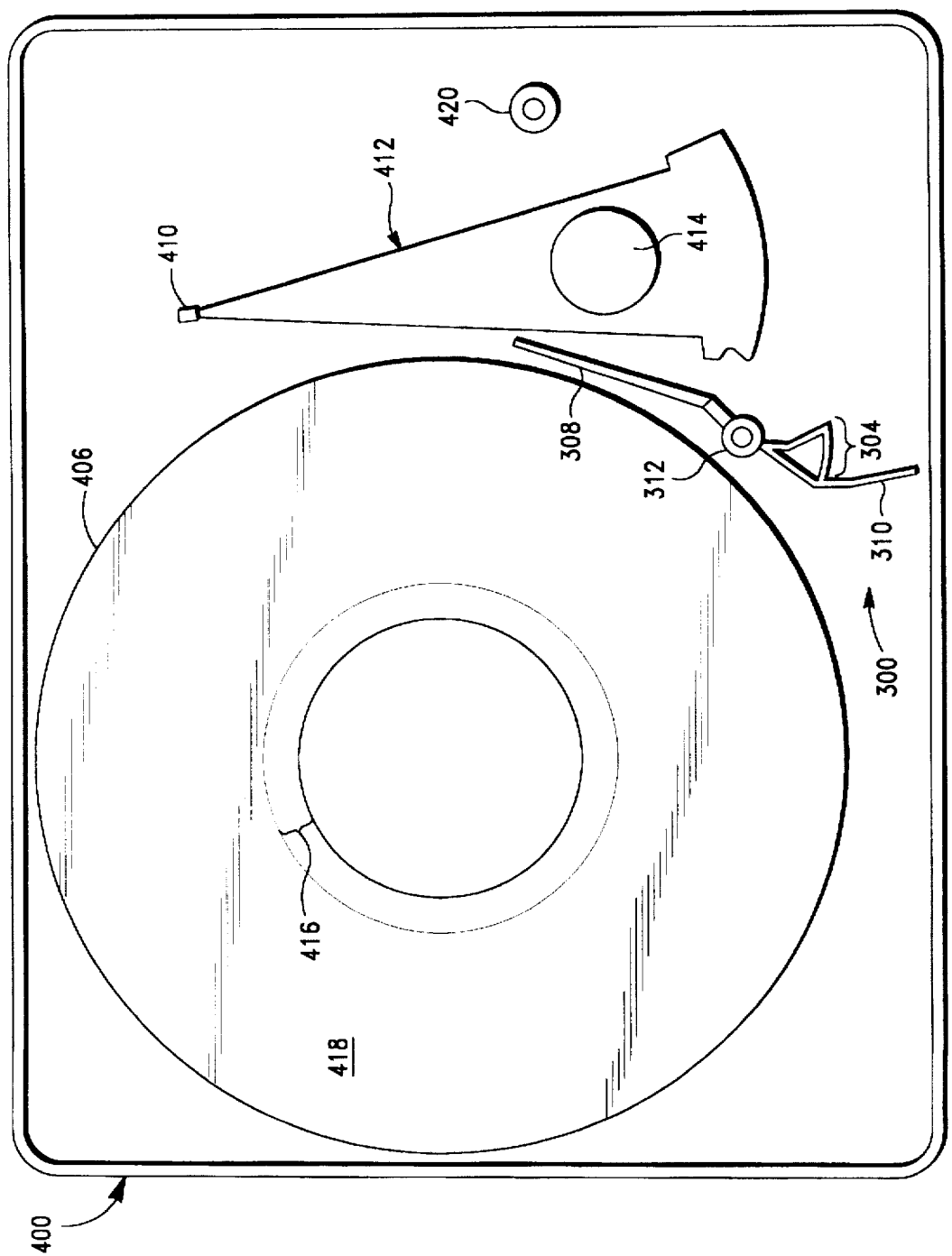
FIG. 8 is a top view of CSAL 300 of FIG. 3 deployed in a rework position in accordance with the present invention.

With reference now to FIG. 8, the exemplary CSAL 300 is shown deployed in a rework position in an exemplary HDA 400. The exemplary HDA 400 is incorporated in a housing having a flat sheet metal, or the like, base. In the HDA 400 During rework of the HDA 400, it can be necessary to remove the disk 402 from the spindle 408 which requires unloading the head 410 off of the disk 402. In an HDA with a prior art OD crash stop, it is necessary to remove the prior art OD crash stop in order to remove the disk. The present invention reduces disassembly of the HDA. That is, in the present invention, the CSAL 300 can be rotated clockwise such that the airlock latch portion 310 and the ACSS 302 are rotated clear of the clockwise path of the back end of the actuator arm 412. With the ACSS 302 rotated clear of the clockwise path of the back end of the actuator arm 412, the disk 102 is accessible for rework.

Thus, the present invention provides an OD crash stop mechanism which provides increased ease of manufacturing including less stringent tolerancing requirements. The present invention further provides an OD crash stop mechanism which need not be removed during rework. Additionally, the present invention provides an OD crash stop mechanism having improved force/deflection characteristics.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An actuator latching apparatus for an actuator arm in a disk drive having a rotating disk, the actuator latching apparatus comprising:

an actuator latch portion that is adapted to be movable relative to the actuator arm, the actuator latch portion including: (i) a latch arm adapted to lock the actuator arm into a selected position, (ii) a wind vane portion adapted to have a wind force exerted thereon, the wind force being generated by the rotating disk, and (iii) an airlock latch portion coupled to the wind vane portion, the airlock latch portion adapted to lock the actuator arm into the selected position; and a crash stop fixed to said actuator latch portion, which moves with said actuator latch portion relative to the actuator arm, the crash stop adapted to restrict the rotation of said actuator arm while being disengaged from said airlock latch portion.

2. The actuator latching apparatus of claim 1 wherein said crash stop is integral with said actuator latch portion.

3. The actuator latching apparatus of claim 1 wherein said crash stop is an outer diameter crash stop.

4. The actuator latching apparatus of claim 1 further comprising a filter integral with said actuator latch portion.

5. The actuator latching apparatus of claim 1 wherein said crash stop includes a buckling and bending section.

6. The actuator latching apparatus of claim 1 further comprising a magnetic portion for providing a magnetic force to said actuator latch portion.

7. A head/disk assembly comprising:

a disk having an inner diameter and an outer diameter;

an actuator arm disposed proximate to said disk, said actuator arm including a distal end;

a head disposed proximate said distal end of said actuator arm, said head adapted to be moved across the surface of said disk between said inner diameter and said outer diameter; and an airlock which is adapted to move relative to the actuator arm, the airlock including;

a wind vane portion adapted to have a wind force exerted thereon, said wind force generated by said disk as said disk rotates;

an airlock latch portion coupled to said wind vane portion, said airlock latch portion adapted to lock said actuator arm into a selected position; and a crash stop fixed to and movable with said airlock latch portion, said crash stop adapted to restrict the rotation of said actuator arm while being disengaged from said airlock latch portion.

8. The head/disk assembly of claim 7 wherein said crash stop is integral with said airlock latch portion.

9. The head/disk assembly of claim 7 wherein said crash stop is an outer diameter crash stop, said outer diameter crash stop for preventing said distal end of said actuator arm and said head from being moved outwardly beyond said outer diameter of said disk.

10. The head/disk assembly of claim 7 wherein said airlock latch portion is adapted to lock said actuator arm into a position such that said distal end of said actuator arm and said head are disposed at or near said inner diameter of said disk.

11. The head/disk assembly of claim 7 further comprising a filter integral with said airlock.

12. The head/disk assembly of claim 7 wherein said crash stop includes a buckling section and a bending section, said buckling section and said bending section resiliently restricting the rotational motion of said actuator arm.

13. The head/disk assembly of claim 7 wherein said airlock further comprises a magnetic portion for providing a magnetic force to said airlock, said magnetic force opposing said wind force.

14. A combinational airlock and crash stop apparatus for a head/disk assembly which includes a rotating disk and an actuator arm, the apparatus comprising:

a wind vane portion, said wind vane portion adapted to have a wind force exerted thereon, said wind force generated by the rotating disk;

an airlock latch portion coupled to said wind vane portion, said airlock latch portion adapted to lock the actuator arm into a selected position such that a head at a distal end of said actuator arm is disposed at or near an inner diameter of said disk;

an outer diameter crash stop integral with said airlock latch portion, said outer diameter crash stop adapted to restrict the rotation of said actuator arm while being disengaged from said airlock latch portion;

a magnetic portion for providing a magnetic force to said crash stop, said magnetic force opposing said wind force;

a buckling section and a bending section for resiliently restricting the rotational motion of said actuator arm, said buckling section and said bending section being movable relative to the actuator arm; and a filter integral with said combinational airlock and crash stop apparatus.

15. A method for restricting the rotation of an actuator arm in a head/disk assembly, the method comprising the steps of:

attaching an outer diameter crash stop portion to an airlock so that the airlock and the outer diameter crash stop portion are movable relative to the actuator arm providing an airlock latch portion fixed to said airlock such that said actuator arm is adapted to be locked by said airlock latch portion; and arranging said airlock and said outer diameter crash stop portion proximate to the actuator arm such that said actuator arm contacts said outer diameter crash stop portion of said airlock as said actuator arm is rotated while being disengaged from said airlock latch portion.

16. The method of claim 15 wherein the step of attaching a crash stop portion to an airlock includes the step of:

attaching a bending section and a buckling section to said airlock latch portion of said airlock.

17. The method of claim 15 wherein the step of attaching a crash stop portion to an airlock includes the steps of:

attaching a first end of a buckling section to said airlock latch portion of said airlock;

attaching a first end of a bending section to a second end of said buckling section; and attaching a second end of said bending section to said airlock latch portion of said airlock, wherein said bending section is positioned to be contacted by a stop tab on said rotating actuator arm.

18. The method of claim 15 wherein the step of attaching a crash stop portion to an airlock includes the steps of:

attaching a first end of a buckling section to said airlock latch portion of said airlock; and attaching a second end of said buckling section to said airlock latch portion of said airlock, wherein said buckling section is positioned to be contacted by a stop tab on a back end of said rotating actuator arm.

* * * * *